United States Patent [19]

Bishop et al.

[11] 4,246,930
[45] Jan. 27, 1981

[54] RELIEF VALVE

[75] Inventors: William V. Bishop; Donald L. Richards, both of Durham, N.C.

[73] Assignee: Eaton Corporation, Cleveland, Ohio

[21] Appl. No.: 19,014

[22] Filed: Mar. 8, 1979

[51] Int. Cl.³ .............................................. F16K 17/26
[52] U.S. Cl. .............................. 137/493.9; 137/226; 137/508; 137/550; 152/427
[58] Field of Search .................... 137/469, 493.9, 224, 137/225, 226, 230, 508, 550; 152/415, 427

[56] References Cited

U.S. PATENT DOCUMENTS

| | | | |
|---|---|---|---|
| 1,156,328 | 10/1915 | Thayer | 136/226 |
| 1,258,114 | 3/1918 | Hayward | 137/224 X |
| 2,991,821 | 7/1961 | Williams | 152/427 |
| 3,422,840 | 1/1969 | Bryant | 137/469 X |
| 3,426,787 | 2/1969 | Fuller | 137/226 |
| 3,504,697 | 4/1970 | Colgan | 137/469 |
| 4,044,793 | 8/1977 | Krueger | 137/508 X |

FOREIGN PATENT DOCUMENTS

| | | | |
|---|---|---|---|
| 1071025 | 3/1954 | France | 137/469 |
| 1205726 | 8/1959 | France | 137/493.9 |

Primary Examiner—Harold W. Weakley
Attorney, Agent, or Firm—R. J. McCloskey; F. M. Sajovec, Jr.

[57] ABSTRACT

A relief valve, particularly adapted for use on racing car tires, which pops open to relieve at a set pressure and then reseats at a pressure slightly lower than the opening pressure. The valve includes a diaphragm (28) a diaphragm retaining plate (36) which has a resilient sealing element (39) molded or otherwise attached to it, a valve seat attached to the center of the diaphragm, and a compression spring (26) acting on the diaphragm to bias the valve seat against the resilient sealing element. When the valve pops open against the spring force, the area above the diaphragm is exposed to a venting pressure, via a port formed through the valve seat and through the diaphragm, which is higher than atmospheric and thus adds to the spring force, resulting in a resealing pressure which is slightly less than the opening pressure. In a second embodiment, a stem member (161) extends through the valve seat (130) and the diaphragm (128) and through the diaphragm retaining member (136) to provide means to pressurize the container to be relieved through an external source, by means of a valve core (175) received within the stem.

12 Claims, 2 Drawing Figures

RELIEF VALVE

This invention relates to pressure relief valves, and more particularly to pressure relief valves for tubeless tires or the like which are subjected to extremely high operating pressures.

It is well known that as an automobile is driven, the temperature of the tires increases causing an increase in the pressure within the tire. Under normal conditions this increase is nominal, and has no adverse effect upon the tire. In automobile racing, however, tire temperatures become extremely high during the course of a race, and the resulting pressure increase can be sufficient to change the contour of a tire to the point where handling of the car is adversely affected, and tire wear is greatly increased.

In order to maintain an essentially constant tire pressure throughout a race by the use of a relief valve, it is important that the valve be set at its resealing pressure and that the resealing pressure is relatively close to the opening pressure. Known tubeless tire relief valves, such as that shown in U.S. Pat. No. 4,046,163, are not suitable for such an application because they are designed to be set at a predetermined opening pressure, and not to maintain a predetermined resealing pressure.

What the present invention provides is a relief valve including a diaphragm, a diaphragm retainer plate which has a resilient sealing element molded or otherwise attached to it, a valve seat attached to the center of the diaphragm, and a compression spring acting on the diaphragm to force the valve seat against the resilient sealing element. When the pressure acting on the diaphragm area minus the vavle seat area exceeds the spring force, the valve seat will lift off the resilient sealing element, thus exposing the entire diaphragm area to the pressure, and causing the valve to pop open. When the valve opens, the area above the diaphragm is exposed to a venting pressure, via a port defined through the valve seat and the diaphragm, which is higher than atmospheric, and which thus adds to the spring force. This results in a resealing pressure which is slightly less than the opening pressure. In an alternative embodiment of the valve the relief valve is combined with a fill valve.

Other objects and advantages of the invention will become apparent from the following description when taken in connection with the accompanying drawings, wherein.

Figure 1:
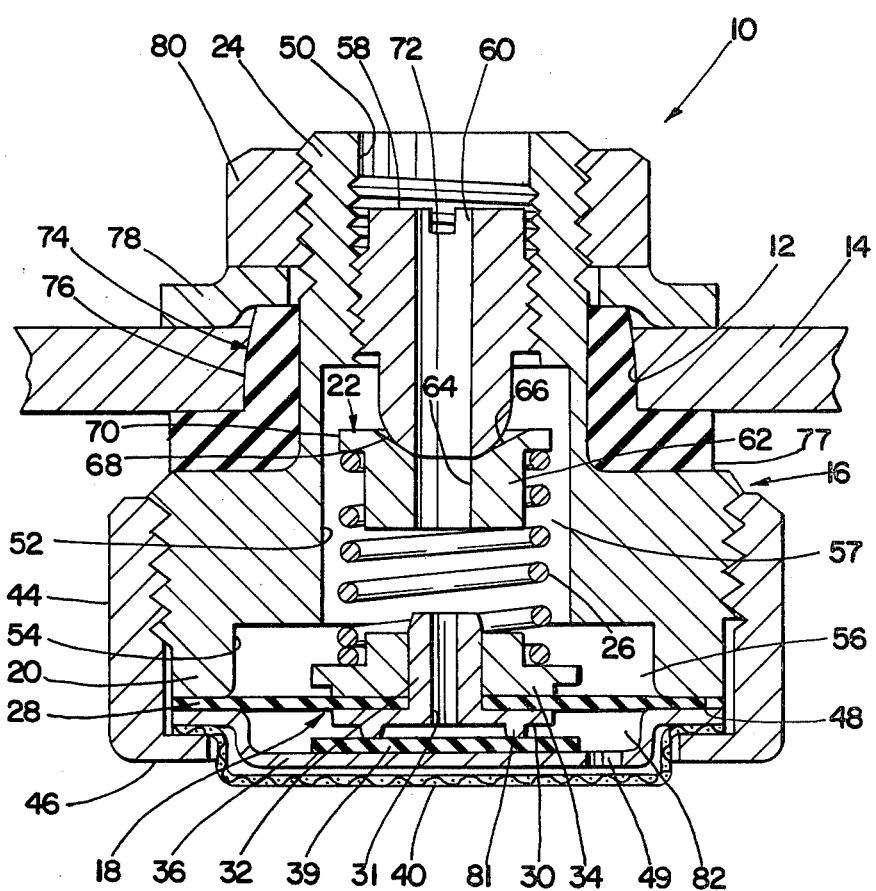
FIG. 1 is a cross-sectional view of a first embodiment of the invention.

Referring to FIG. 1, there is illustrated a relief valve, designated generally by the numeral 10, which is received through a hole 12 formed in the rim 14 of a vehicle wheel. The relief valve comprises a body 16, a valve assembly 18 attached to one end 20 of the valve body, a spring retainer assembly 22 received in the opposite end 24 of the valve body 16, and a valve spring 26 acting between the valve assembly 18 and the spring retainer assembly 22.

The valve assembly 18 comprises a diaphragm 28, a valve seat member 30 which includes a cylindrical extended portion 32 received through a hole formed through the center of the diaphragm, a spring guide member 34 received over the cylindrial extension 32 and fixed thereto, a diaphragm retainer plate 36 which includes an annular outer edge portion in contact with the diaphragm, a sealing element 39 bonded or otherwise fastened to the retainer, a wire mesh screen member 40 which includes an annular outer edge portion in contact with the edge portion of the retainer, and a cap member 44 threadedly received on the valve body 16, and including an inwardly directed annular lip portion 46 which clamps the outer edges of the screen 42, the retainer 36 and the diaphragm 28 against the bottom surface 48 of the valve body. A hole 49 is formed in the diaphragm retainer to expose the area under the diaphragm to the tire pressure. The sealing element 39 can be formed of rubber or another suitable sealing material.

The valve body 16 has a stepped bore formed therethrough including a relatively small diameter portion 50 formed in the end 24 of the valve body, an enlarged diameter portion 52, and a relatively large counterbore 54 defining a chamber 56 above the diaphragm 28. The spring retainer assembly 22 comprises an adjusting screw 58, including a through bore 60, which is threaded into the bore 50, and a cylindrical member 62, having a through bore 64 formed therein, and having a conical depression 66 formed therein which is engaged by a rounded projecting portion 68 of the screw 58. The spring 26 is received between an annular lip 70 formed on the cylindrical member 62 and the spring guide member 34, and the preload on the spring is adjusted by the depth to which the adjusting screw 58 is threaded into the valve body. To facilitate adjustment a screwdriver slot 72 can be formed in the end of the screw 58.

The outer diamter of the end 24 of the valve body is somewhat smaller than the diameter of the receiving hole in the rim 14, and the valve assembly is sealingly engaged with the rim by means of a resilient sealing element or grommet 74. The grommet 74 includes a cylindrical portion 76 which provides a seal between the outside diameter of the end 24 of the valve body and the rim hole, and an annular flange portion 77 which provides a seal between the valve body 16 and the inside surface of the rim 14.

The valve member is retained on the rim 14 by means of a washer 78 which bears against the outside surface of the rim 14 and against the grommet 24, and a nut 80 which is threaded onto the end 24. As the nut is tightened, the rim is clamped betwen the washer 28 and the valve body, and the grommet is compressed to form an air tight seal. The grommet can be rubber or another suitable sealing material.

Before the valve is assembled to a wheel rim the spring 26 is preloaded, by means of the adjusting screw 58, by a predetermined amount depending on the desired resealing pressure of the valve. When the valve is installed and the tire pressurized by means of a separate, conventional fill valve (not shown), the valve assembly will be in the condition shown in FIG. 1, with an annular projection 81 formed on the underside of the valve seat member in sealing engagement with the sealing element 39. The area 82 between the diaphragm 28 and the retainer 36 is exposed to tire pressure by means of the hole 49; however, at this point the valve remains closed because the pressure at which the spring preload will be overcome to open the valve is slightly greater than the predetermined resealing pressure at which the valve was initially set.

When the valve is closed, the opening force acting on the diaphragm is the tire pressure multiplied by the area of the diaphragm which is exposed to the pressure. In this case, the actual area is the free area of the diaphragm minus the valve seat area defined by the outside diameter of the annular projection 81. As the tire heats up from use, and this pressure force exceeds the preload of the spring 26, the valve seat member 30 will lift off the seal element 39, thus exposing the entire free diaphragm area to the tire pressure. This sudden increase in area causes a sudden increase in pressure force acting against the spring, and the valve pops open, venting the tire pressure to atmostphere through a vent 31 formed through the valve seat member 30 and through the bores 64 and 60 through the retaining member 62 and the adjusting screw 58, respectively. When the valve opens, the chamber 56 and the chamber 57 defined by the enlarged diameter bore 52 are subjected to a venting pressure which is somewhat above atmospheric, thus this pressure adds to the spring pressure tending to close the valve. The result is that the valve reseals at a pressure which is only slightly lower than the opening pressure.

In an auto racing application, the temperature of a racing tire tends to increase quickly to some maximum, and then stays essentially constant. The small pressure range between opening and resealing which this valve provides minimizes the pressure increase due to the temperature rise. Test resutls from actual races indicate that the valve can double the life of a racing tire, while maintaining essentially constant handling characteristics. Because the valve reacts quickly and on a very small pressure differential, the tire pressure changes are not noticed by the driver.

Figure 2:
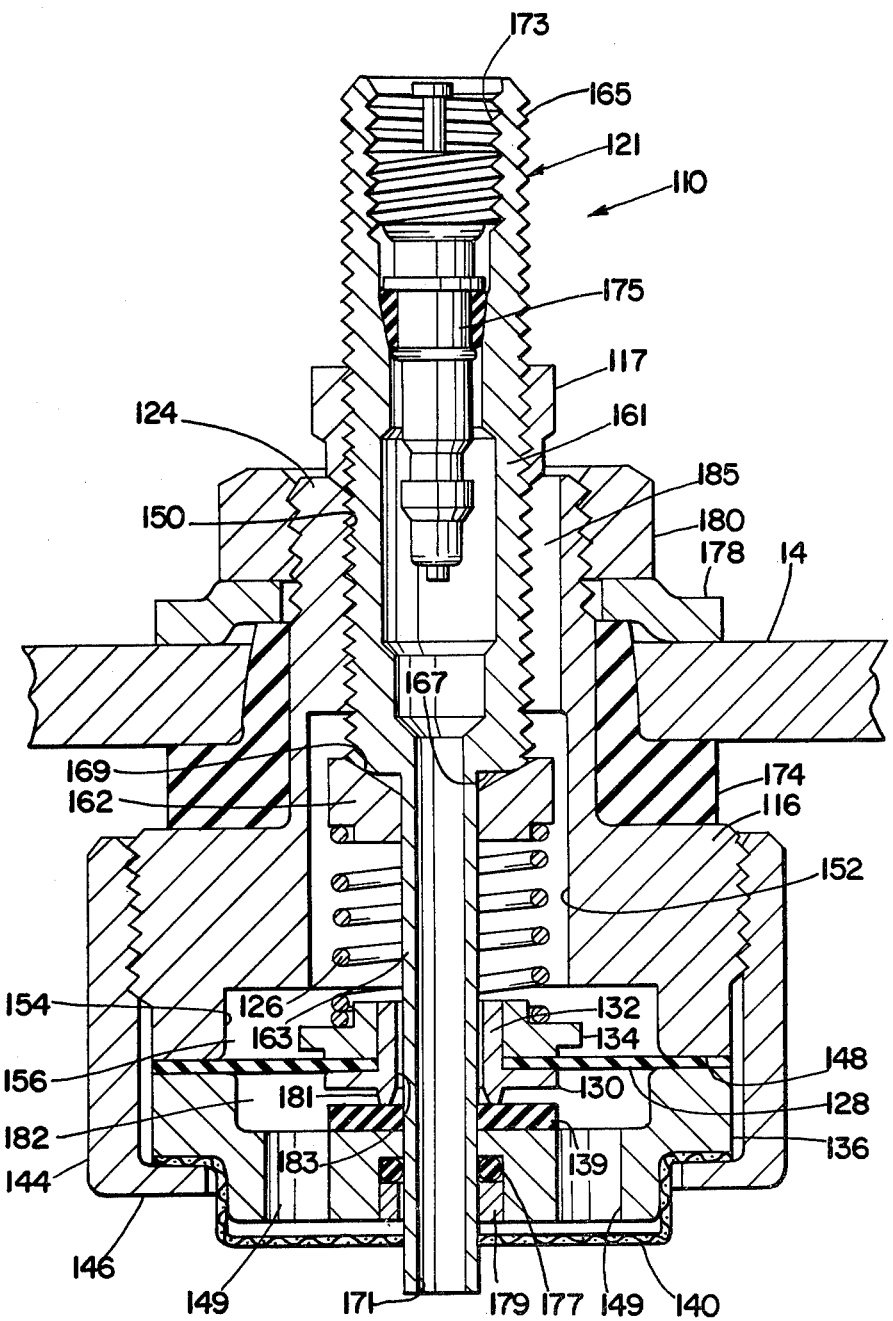
FIG. 2 is a cross-sectional view of a second embodiment of the invention.

In FIG. 2, there is illustrated a valve which performs the same relief function as that shown in FIG. 1, but which also incorporates the tire fill valve. Elements of the FIG. 2 embodiment which perform the same function as elements of the FIG. 1 embodiment will be referred to by a reference numeral having the same last two digits.

The relief valve 110 includes a valve body 116, grommet 174, washer 178 and nut 180 which are essentially identical to corresponding elements of the FIG. 1 embodiment, and the attachment of the valve assembly 110 to the rim 14 will not be discussed in detail. As in the FIG. 1 embodiment, the valve assembly comprises a diaphriagm 128; a valve seat member 130, which includes a cylindrical extended portion 132 received through a hole formed through the center of the diaphragm; a spring guide member 134 received over the cylindrical extension; a diaphragm retaining member 136, which includes an annular outer edge portion in contact with the diaphragm; a sealing element 139 bonded or otherwise fastened to the retainer; a wire mesh screen member 140 which includes an annular outer edge portion in contact with the edge portion of the retainer; and a cap member 144 threadedly received on the valve body 116, and including an inwardly directed annular lip portion 146 which clamps the outer edges of the screen 142, the retainer 136 and the diaphragm 28 against the bottom surface 148 of the valve body. Ports 149 formed through the diaphragm retainer expose the area 182 under the diaphragm to the tire pressure.

The valve body 116 has a stepped bore, as in the FIG. 1 embodiment, including a small diameter portion 150, and enlarged diameter portion 152, and a relatively large counterbore 154 defining a chamber 156 above the diaphragm.

The valve assembly includes a valve stem assembly 121 which comprises a spring retaining member 162 having a through bore formed therein and a member 161 which includes an elongated portion 163 extending through the retaining member 162, and a valve core retaining portion 165. A wall 167 defined by the intersection of the elongted portion 163 with the valve core retaining portion 165 is in engagement with a conical portion 169 of the cylindrical member 162.

The elongated portion 163 includes a through bore 171, and also extends through holes formed through the valve seat member 130, the diaphragm 128, the diaphragm retainer 136 and the screen 140.

The valve core retaining portion 165 is threadedly received in the bore 150 of the valve body 116 and includes a stepped bore 173 which is partially threaded to receive a valve core assembly 175. The valve core assembly 175 forms no part of the present invention and can be any suitable known design such as that shown in U.S. Pat. No. 4,097,075. A seal is formed between the elongated portion 163 and the diaphragm retainer 156 by means of an O-ring 177 and an O-ring retainer 179 received in a counterbore formed in the diaphragm retainer.

A spring 126 is received between the cylindrical member 162 and the spring guide 134, and the spring preload is adjusted by adjusting the position of the stem member 161 within the valve body. Once a desired preload is obtained, the position of the stem member 161 can be maintained by means of a locknut 117 bearing against the valve body 116. Flats (not shown) can be formed on the outer diameter of the stem member to facilitate adjustment.

When the valve 110 is installed in the tire rim 14, the tire can be inflated by conventional means which open the valve element of the valve core assembly 175 to pressurize the tire via the bores 173 and 171 in the stem member 161.

When the tire is inflated to its predetermined initial pressure, the valve assembly will be in the condition illustrated in FIG. 2, with an annular projection 181 formed on the underside of the valve seat member 130 in sealing engagement with the seal element 139.

The relieving function of the FIG. 2 embodiment of the valve is the same as that of the FIG. 1 embodiment except that when the pressure in the tire increases sufficiently to overcome the preload of the spring 126, the excess pressure is relieved through the annular space 183 formed between the bore through the valve seat member 130 and the outside diameter of the elongated portion 163 of the stem member 161, and through a plurality of slots 185 (one shown in FIG. 2) formed in the inside diameter of the end 124 of the valve body 116 and opening outward to the atmosphere.

We claim:

1. A pressure relief valve comprising a valve body having a through bore formed therein and an enlarged counterbore formed in one end thereof; a diaphragm in engagement with said one end and disposed over said counterbore to define a first chamber; a diaphragm retaining member having a portion thereof in engagement with an annular edge portion of said diaphragm; retaining means clamping said diaphragm and said diaphragm retaining member against said one end of said valve body; a resilient sealing element attached to said diaphragm retaining member; a valve seat member attached to said diaphragm; spring means acting between said valve body and said diaphragm to bias said valve seat member into sealing engagement with said resilient sealing element; and tubular valve stem means received in said through bore and extending through said valve seat member and through said diaphragm, said diaphragm retaining member, and said resilient sealing element; said valve stem means including a valve element received therein for selectively passing a pressurized fluid therethrough.

2. Apparatus as claimed in claim 1, including sealing means received in said diaphragm retaining member and sealingly engaged by the outer diameter of said tubular valve stem means.

3. Apparatus as claimed in claim 1 in which said valve seat member includes a substantially disc-shaped portion in contact with said diaphragm and a cylindrical portion extending through said diaphragm, said relief valve further including an annular valve seat retaining member received over said cylindrical portion and fixed thereto.

4. Apparatus as claimed in claim 3 in which said diaphragm retaining member is shaped to define a second chamber between a wall of said diaphragm retaining member and said diaphragm, a hole is formed in said diaphragm retaining member to expose said second chamber to the pressure to be relieved, and clearance is provided between the hole in said diaphragm retaining member and the outside diameter of said valve stem means to define a fluid conduit connecting said first chamber with said second chamber when said valve seat member is out of contact with said resilient sealing element.

5. Apparatus as claimed in claim 3 in which said valve seat member includes an annular projection formed thereon and sealingly engageable with said resilient sealing element.

6. Apparatus as claimed in claim 4 in which said resilient sealing element is attached to said wall of said diaphragm retaining member.

7. Apparatus as claimed in claim 3 in which said tubular valve stem means includes a portion having a first diameter threadedly received in said valve body and a portion having a second reduced diameter extending through said valve seat member, said resilient sealing element and said diaphragm retaining member and diaphragm; said relief valve further including an annular spring retaining member received over said second diameter portion and in engagement with a shoulder defined by the intersection of said first and second diameters, said spring means comprising a coil spring received between said annular spring retaining member and said valve seat retaining member.

8. Apparatus as claimed in claim 7 including a locknut received over said first diameter portion and in engagement with said valve body.

9. Apparatus as claimed in claim 1 including a screen member received over said diaphragm retaining member and clamped thereto by said retaining means, said valve stem means extending through said screen member.

10. Apparatus as claimed in claim 1, including means for sealingly attaching said valve body to a pressurized container.

11. Apparatus as claimed in claim 10, in which said means for sealingly attaching said valve body comprises a resilient grommet received between said valve body and said container, a washer in engagement with said grommet and said container, and a nut in engagement with said washer and threadedly received on said valve body.

12. Apparatus as claimed in claim 1 including axially oriented port means formed through said valve body to define a conduit fluidly connecting said first chamber to the atmosphere outside said pressurized container.

* * * * *